United States Patent
Ma et al.

(10) Patent No.: US 12,079,855 B2
(45) Date of Patent: Sep. 3, 2024

(54) SEASONALITY SCORE SYSTEMS AND METHODS

(71) Applicant: Walmart Apollo, LLC, Bentonville, AR (US)

(72) Inventors: Luyi Ma, Sunnyvale, CA (US); Nimesh Sinha, San Jose, CA (US); Parth Ramesh Vajge, Sunnyvale, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 127 days.

(21) Appl. No.: 17/556,832

(22) Filed: Dec. 20, 2021

(65) Prior Publication Data

US 2023/0196434 A1    Jun. 22, 2023

(51) Int. Cl.
*G06Q 30/0601* (2023.01)
*G06Q 30/0201* (2023.01)
*G06Q 30/0251* (2023.01)

(52) U.S. Cl.
CPC ..... *G06Q 30/0631* (2013.01); *G06Q 30/0201* (2013.01); *G06Q 30/0256* (2013.01); *G06Q 30/0641* (2013.01)

(58) Field of Classification Search
CPC ........... G06Q 30/0631; G06Q 30/0201; G06Q 30/0256; G06Q 30/0641
See application file for complete search history.

(56) References Cited

U.S. PATENT DOCUMENTS

| | | |
|---|---|---|
| 7,113,917 B2 | 9/2006 | Jacobi et al. |
| 7,437,344 B2 | 10/2008 | Peyrelevade |
| 7,720,720 B1 | 5/2010 | Sharma et al. |

(Continued)

FOREIGN PATENT DOCUMENTS

JP    2018526739 A  *  9/2018  ........... A45D 44/005

OTHER PUBLICATIONS

Silva, Xavier dos Santos. "Recommender Systems for Grocery Retail—A Machine Learning Approach." Order No. 28992768 Instituto Politecnico do Porto (Portugal), 2020. Ann Arbor: ProQuest. Web. Jul. 19, 2022. (Year: 2020).

(Continued)

*Primary Examiner* — Alexandru Cirnu
(74) *Attorney, Agent, or Firm* — Morgan, Lewis & Bockius LLP; Manita Rawat

(57) ABSTRACT

Systems and methods for generating and using seasonal affinity scores is disclosed. A set of user-specific historical transaction data is obtained and a user-specific affinity score including at least one of a user-specific season affinity score or a user-specific seasonal theme affinity score is determined by determining one or more product affinity scores for a set of product taxonomies and combining the one or more product affinity scores with one or more product index scores to generate the user-specific affinity score. The product affinity scores are determined by a trained scoring calculation model configured to receive the set of user-specific historical transaction data. One or more interface elements are selected based on the user-specific affinity score and an interface is generated including the one or more interface elements.

15 Claims, 12 Drawing Sheets

(56) References Cited

U.S. PATENT DOCUMENTS

| | | |
|---|---|---|
| 8,015,140 B2 | 9/2011 | Kumar et al. |
| 10,192,253 B2 | 1/2019 | Huet et al. |
| 10,445,742 B2 | 10/2019 | Prendki |
| 10,867,340 B1 | 12/2020 | Gauvin et al. |
| 10,991,028 B1 | 4/2021 | Aubrey et al. |
| 2014/0316849 A1* | 10/2014 | Pasila ................ G06Q 30/0201 705/7.29 |
| 2015/0187024 A1* | 7/2015 | Karatzoglou ...... G06Q 30/0201 705/319 |
| 2016/0328787 A1 | 11/2016 | Szulczewski et al. |
| 2017/0287044 A1 | 10/2017 | Rose et al. |
| 2019/0057405 A1* | 2/2019 | Jain ....................... G06F 16/957 |
| 2019/0073708 A1 | 3/2019 | Mitra et al. |
| 2019/0108557 A1* | 4/2019 | Jain .................... G06Q 30/0269 |
| 2019/0370879 A1 | 12/2019 | Bhattacharjee |
| 2021/0142385 A1 | 5/2021 | Alahmady |

OTHER PUBLICATIONS

Kim, et al., "A Conditional Feature Utilization Approach to Itemset Retrieval in Online Shopping Services." Journal of Electronic Commerce Research 15.4 (2014): 317-38. ProQuest. Web. Feb. 2, 2022. (Year: 2014).

Balazs Hidasi et al., "Fast ALS-Based Tensor Factorization for Context-Aware Recommendation from Implicit Feedback," 2012, pp. 67-82.

Romain Warlop, "Novel Learning and Exploration-Exploitation Methods for Effective Recommender Systems," Universit'e des Sciences et des Technologies de Lille, Oct. 19, 2018, 158 pages.

\* cited by examiner

SEASONALITY SCORE SYSTEMS AND METHODS

TECHNICAL FIELD

This application relates generally to data retrieval and, more particularly, to machine-learnt retrieval using seasonality scores.

BACKGROUND

Computer-implemented retrieval of relevant items from a database or catalog relies on item scoring. Current systems utilize scoring functions that consider past item selection history to identify and present preferred items through an interface. For example, in an e-commerce environment, a scoring function may identify products for presentation through an e-commerce interface based on prior product selection and attributes, such as brand, product type, size, product category, etc.

Over a given time period (such as a calendar year), user preferences may change based on specific holidays, festivals, events, etc. (referred to herein as "seasons"). Current systems utilize item selection (e.g., purchase) histories without accounting for user preference changes due to changing seasons. In addition, while some users may have a seasonal preference related to a first season, other users may have a seasonal preference related to a second season that overlaps with the first season.

SUMMARY

In various embodiments, a system is disclosed. The system includes a non-transitory memory having instructions stored thereon and a processor configured to read the instructions. The processor is configured to obtain a set of user-specific historical transaction data, determine a user-specific affinity score including at least one of a user-specific season affinity score or a user-specific seasonal theme affinity score, select one or more interface elements based on the user-specific affinity score, and generate an interface including the one or more interface elements. The user-specific affinity score is determined by determining one or more product affinity scores for a set of product taxonomies and combining the one or more product affinity scores with one or more product index scores to generate the user-specific affinity score. The product affinity scores are determined by a trained scoring calculation model configured to receive the set of user-specific historical transaction data.

In various embodiments, a non-transitory computer readable medium having instructions stored thereon is disclosed. The instructions, when executed by a processor cause a device to perform operations including obtaining a set of historical transaction data, determining an affinity score including at least one of a season affinity score or a seasonal theme affinity score, selecting one or more interface elements based on the affinity score, and generating an interface including the one or more interface elements. The affinity score is determined by determining one or more product affinity scores for a set of product taxonomies and combining the one or more product affinity scores with one or more product index scores to generate the affinity score. The product affinity scores are determined by a trained scoring calculation model configured to receive the set of user-specific historical transaction data.

In various embodiments, a computer-implemented method is disclosed. The computer-implemented method includes the steps of determining one or more product affinity scores for a set of product taxonomies, combining the one or more product affinity scores with one or more product index scores to generate a user-specific affinity score, selecting one or more interface elements based on the user-specific affinity score, and generating an interface including the one or more interface elements. The product affinity scores are determined by a trained scoring calculation model configured to receive a set of historical transaction data.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 8 is a process flow illustrating a method of calculating a seasonal theme affinity score using one or more product affinity scores, in accordance with some embodiments.

DETAILED DESCRIPTION

Figure 1:
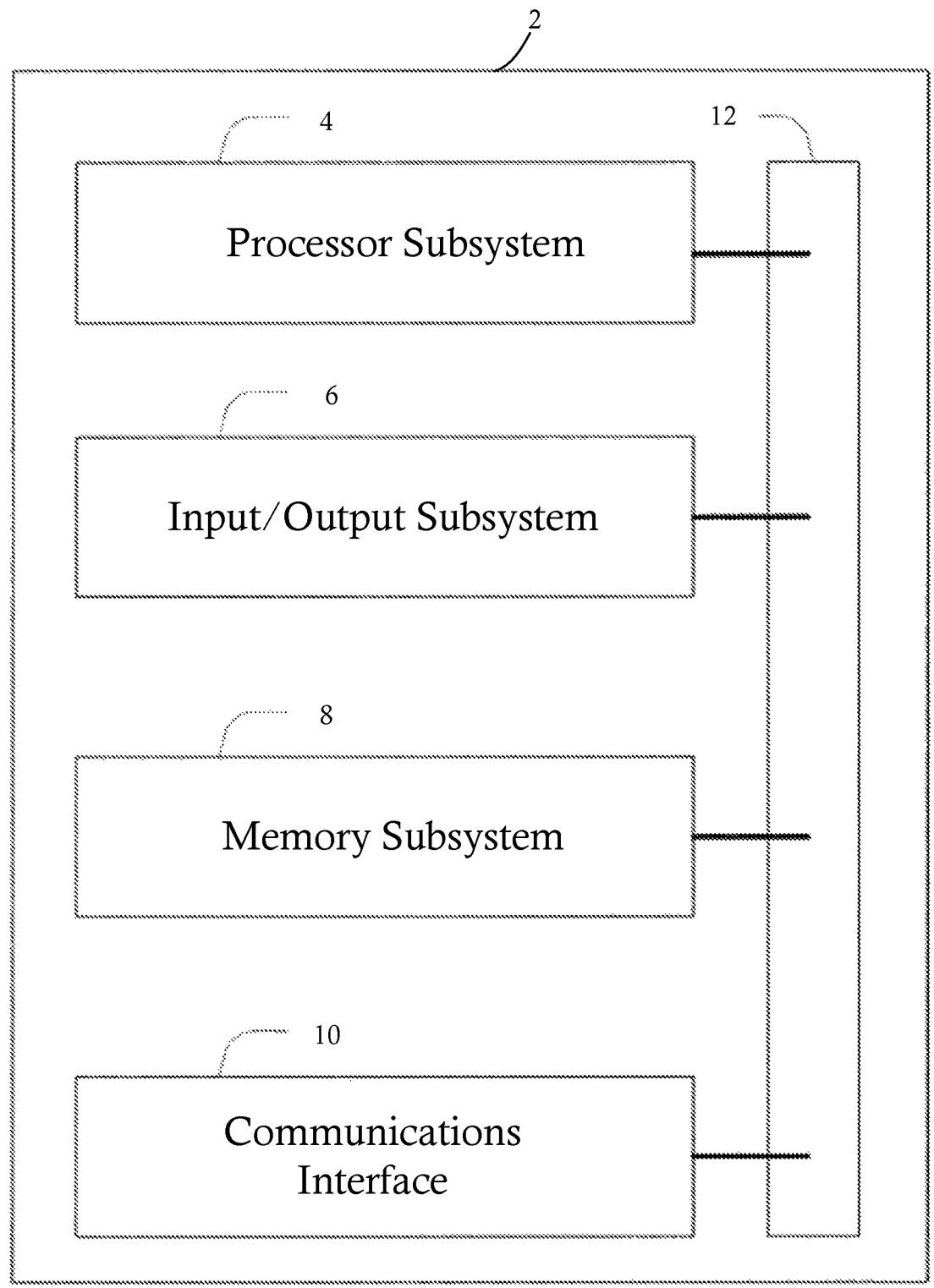
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In various embodiments, systems and methods of determining and using user-specific seasonal affinity scores and/or user-specific seasonal theme affinity scores are disclosed. The user-specific seasonal affinity scores and/or user-specific seasonal theme affinity scores represent a user affinity to, or preference for, specific defined seasons. The user-specific affinity scores may be used to provide one-to-one personalization of a user interface to a specific user. In some embodiments, temporal interaction of a user is incorporated to determine a periodicity to user interactions with an interface. The user-specific affinity scores are determined my one or more trained models. The calculated scores may be used to identify and rank various sequential and/or overlapping seasons to provide customer-specific customization of a user interface tailored to that user's specific seasonal preferences. User preference scores may also be used to predict seasonal engagement and needs over a large user base prior to the season.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including generating and using one or more seasonal affinity scores and/or one or more theme affinity scores, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
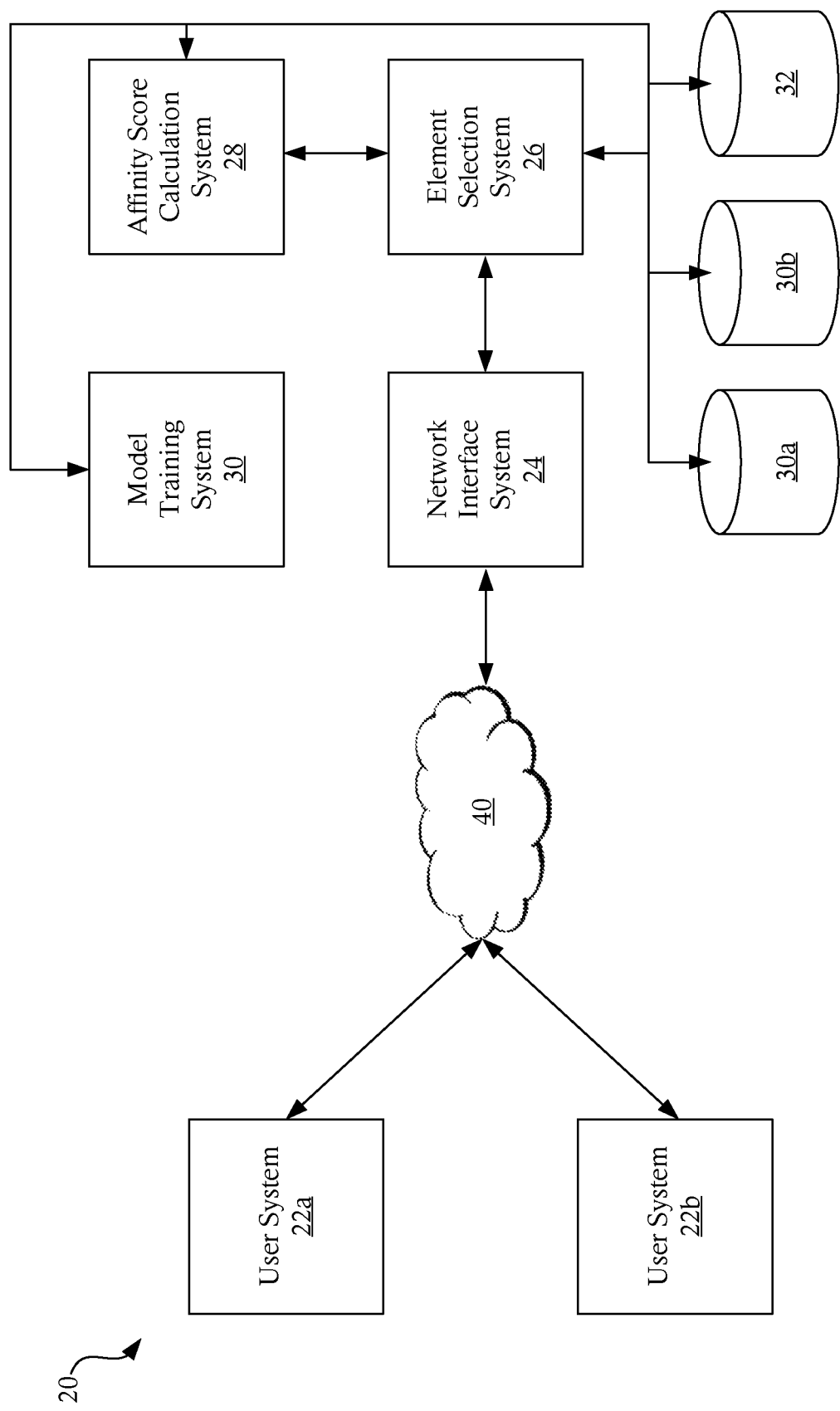
FIG. 2 illustrates a network environment configured to provide item ranking and retrieval using a ranking model, in accordance with some embodiments.

FIG. 2 illustrates a network environment 20 configured to provide item recommendations and suggestions based on a user season affinity score and/or one or more user theme affinity scores, in accordance with some embodiments. The network environment 20 may include, but is not limited to, one or more user systems 22a, 22b, a network interface system 24, an element selection system 26, an affinity score calculation system 28, a model training system 30, one or more item databases 32a, 32b, one or more historical transaction databases 34, and/or any other suitable system. Each of the systems 22a-30 and/or the databases 32a-34 may include a system as described above with respect to FIG. 1. Although embodiments are illustrated herein having discrete systems, it will be appreciated that one or more of the illustrated systems may be combined into a single system configured to implement the functionality and/or services of each of the combined systems. For example, although embodiments are illustrated and discussed herein including each of a network interface system 24, an element selection system 26, a affinity score calculation system 28, and a model training system 30, it will be appreciated that these systems may be combined into a single logical and/or physical system configured to perform the functions and/or provide services associated with each of the individual systems. It will also be appreciated that each of the illustrated systems may be replicated and/or split into multiple systems configured to perform similar functions and/or parts of a function.

In some embodiments, the network interface system 24 is configured to provide a network interface to the one or more user systems 22a, 22b. The network interface may include any suitable type of network interface, such as, for example, an e-commerce interface, a search interface, an inventory interface, etc. Although embodiments are discussed herein with reference to an e-commerce network interface, it will be appreciated that the disclosed systems and methods are applicable to any interface including sets of items that may be associated with various seasons and/or themes.

In some embodiments, the network interface 24 is configured to receive a user identifier from a user system 22a, 22b. The user identifier may include, for example, a user name, an identifier included in a cookie or other digital file, and/or any other suitable identifier. The identifier is unique to a user and/or may identify a user system 22a, 22b used by multiple users.

In some embodiments, the network interface system 24 is in signal (e.g., data) communication with an element selection system 26. The element selection system 26 is configured to retrieve a set of items for inclusion in the user interface based on a user season affinity score and/or one or more user theme affinity scores. For example, in some embodiments, the element selection system 26 utilizes a calculated user season affinity score to select items associated with a predetermined season. As another example, in some embodiments, the element selection system 26 utilizes one or more calculated theme affinity scores to select items associated with one or more predetermined seasonal themes. The selected items may be presented to a user through the user interface, for example, as a container element presented in one or more containers within the user interface (e.g., lists, carousels, etc.).

In some embodiments, the element selection system 26 is in signal (e.g., data) communication with one or more item databases 30a, 30b containing data elements corresponding to items available in one or more catalog of items. In some embodiments, the element selection system 26 is configured identify items within the one or more item databases 32a, 32b based on user season affinity scores and/or user theme affinity scores. For example, in some embodiments, the items stored and/or represented within each of the one or more item databases 32a, 32b may include identifiers associating the items with one or more seasons and/or one or more seasonal themes. The element selection system 26 may be configured to retrieve items that are categorized and/or otherwise associated with seasons or seasonal themes for which a user has a high affinity, e.g., for which the use has a high affinity score, as discussed in greater detail herein.

In some embodiments, the element selection system 26 is in signal (e.g., data) communication with a affinity score calculation system 28. The affinity score calculation system 28 is configured to calculate a user season affinity score and/or one or more user theme affinity scores for the user. As discussed in greater detail below, the affinity score calculation system 28 is configured to utilize historic transaction data in conjunction with one or more trained machine learning models to calculate a user-specific affinity score for one or more seasons and/or one or more seasonal themes.

As used herein, the term "season" refers to events, holidays, activities, festivals, etc. that occur within a common temporal period within a specific time frame. Examples of seasons may include, but are not limited to, yearly holidays or festivals occurring on specific days (such as New Year's Day, Fourth of July, Juneteenth, Christmas, etc.), yearly holidays or festivals occurring over multiple days (e.g., Hanukah, Kwanza), and/or any other suitable reoccurring activity or event within a temporal period.

In some embodiments, the term season refers to a portion of time leading up, surrounding, and/or following a holiday, event, etc. (e.g., "Christmas Season," "Holiday Season," "Valentine's Season," etc.). In some embodiments, the term season refers to periods of time related to specific themes or activities that are common during a period of the year (or other temporal identifier). For example, such seasons may coincide with activities common to predetermined time periods during a temporal period, such as a calendar year (e.g., "Beach Season," "Ski Season," "Back to School Season," etc.). As another example, such seasons may coincide with actual seasons defined by temporal periods (e.g., "Summer season," "Fall season," etc.). It will be appreciated that a "season" may refer to any specific temporal period that includes common elements, items, etc.

In some embodiments, each season includes one or more "themes." For example, in various embodiments, themes may include, but are not limited to, activities performed during the season, items purchased during the season, sentiments or ideas common to the season, and/or any other common concept, idea, or other theme of the defined season. As one non-limiting example, a "Holiday Season" may be defined that includes various "Holiday" related themes, such as, for example, a "holiday lighting" theme, a "holiday present" theme, a "holiday dinner" theme, a "holiday activity" theme, etc. Each of the themes may similarly include sub-themes. For example, the "holiday present" theme of the prior example may include various categories such as "Infant presents," "toddler presents," etc. As will be appreciated, the various season and/or themes may be broadly and/or narrowly defined to allow focus on various sets of goods, services, items, etc. that may be presented by the user interface.

In some embodiments, the affinity score calculation system 28 is configured to generate seasonal affinity scores and/or theme affinity scores for a user associated with the user system 22a, 22b. For example, in some embodiments, the affinity score calculation system 28 implements a trained machine learning model configured to calculate a user seasonal affinity score based on historical data. The historical data is stored in a database, such as historical database 34, in signal communication with the affinity score calculation system 28. The affinity score calculation system 28 retrieves historical data for a user associated with the user system 22a, 22b and, as discussed in greater detail below, provides the historical data to at least one trained machine learning model configured to calculate a user seasonal affinity score and/or one or more user theme affinity scores.

In some embodiments, the affinity score calculation system 28 is in signal (e.g., data) communication with a model training system 30. The model training system 30 is configured to generate and/or update one or more trained machine learning models configured to calculate a seasonal affinity score and/or a theme affinity score. In some embodiments, the model training system 30 is configured to implement a machine learning process based on historical data for a large customer base. As discussed in greater detail below, the model training system 30 may be configured to generate a trained alternating least square (ALS) model, although it will be appreciated that any suitable machine learning model and/or architecture may be used.

Figure 3:
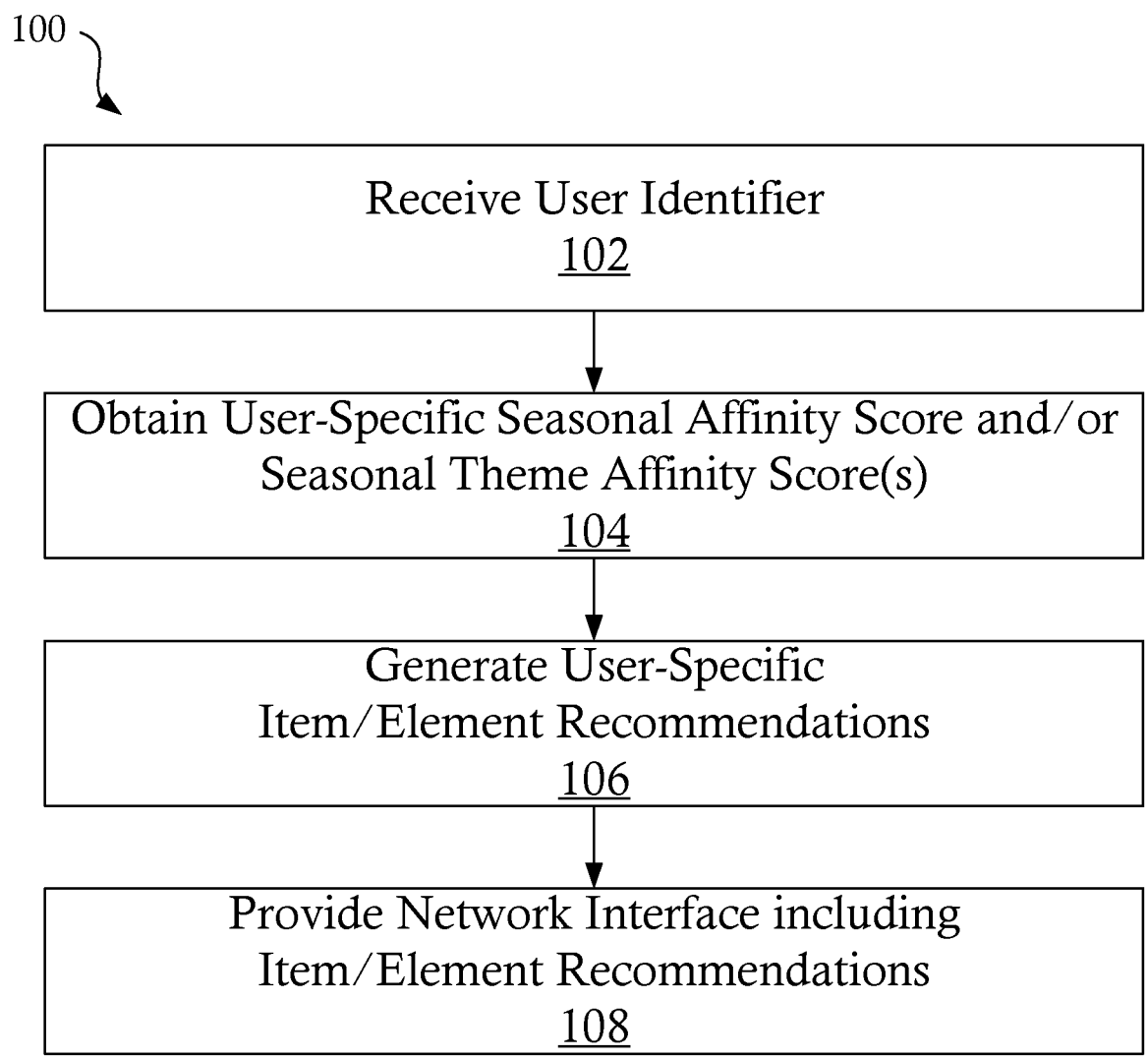
FIG. 3 is a flowchart illustrating a method of generating a network interface including elements selected based on one or more seasonal affinity scores and/or one or more theme affinity scores, in accordance with some embodiments.
Figure 4:
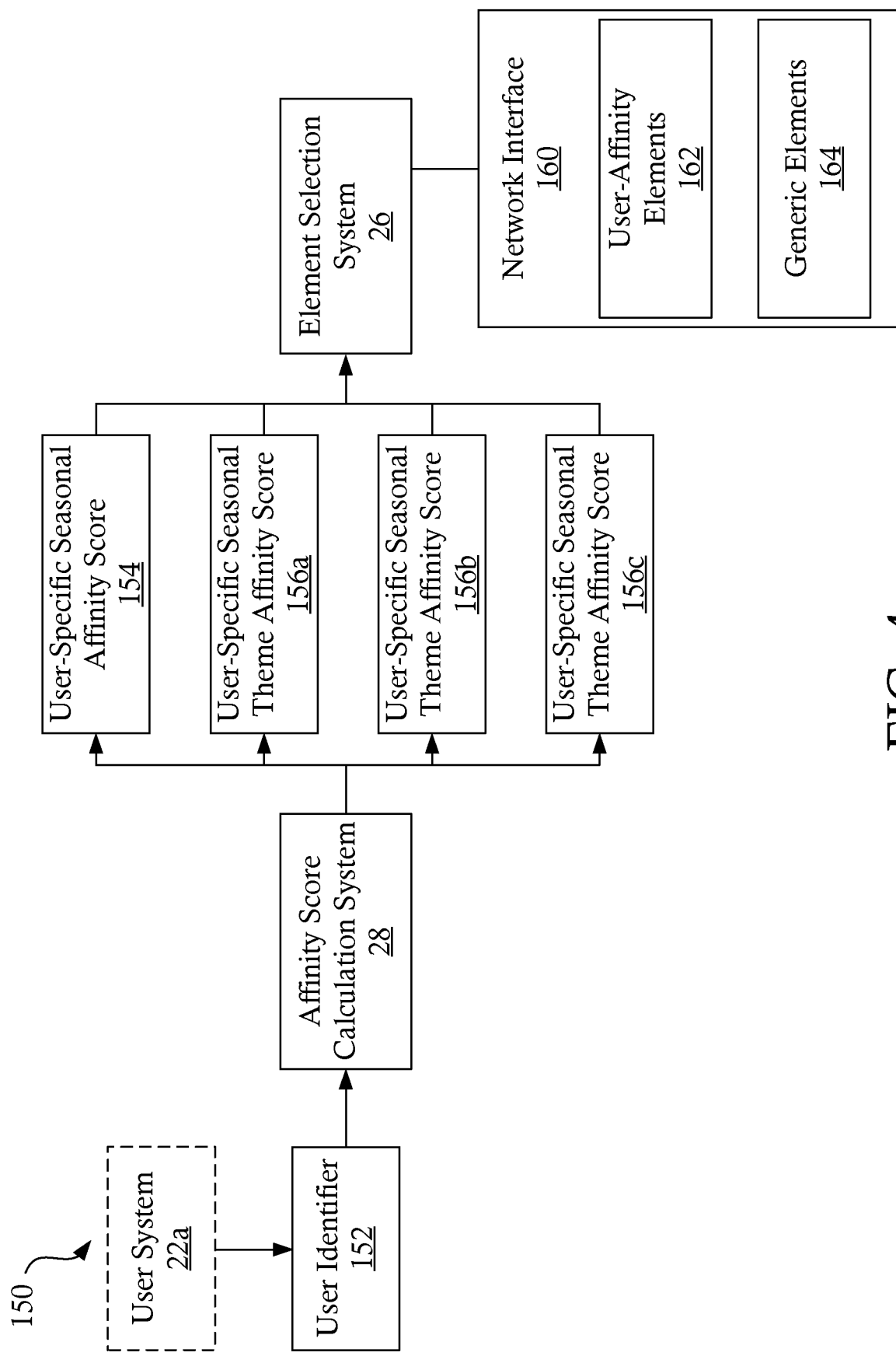
FIG. 4 is a process flow illustrating various steps of the method of generating a network interface illustrated in FIG. 3, in accordance with some embodiments.

FIG. 3 is a flowchart illustrating a method 100 of generating a network interface including elements selected based on one or more seasonal affinity scores and/or one or more theme affinity scores, in accordance with some embodiments. FIG. 4 is a process flow 150 illustrating various steps of the method 100 of generating a network interface illustrated in FIG. 3, in accordance with some embodiments. At step 102, a user identifier 152 is received by a network interface system, such as, for example, the network interface system 24 discussed above. As previously discussed, the network interface system 24 is configured to generate one or more network environments or interfaces. Embodiments discussed herein include an e-commerce environment, although it will be appreciated that other environments, such as development environments, service environments, etc., may be provided by the network interface system 24.

The user identifier 152 is configured to identify a user associated with a user system 22a, 22b. The user identifier 152 may include any suitable user identifier, such as, for example, a user name, a unique token or identifier, a beacon code, a cookie identifier, etc. The user identifier 152 may be automatically provided by a user system 22a, 22b when the user system 22a, 22b interacts with the network interface system 24 and/or may be provided by a user of the user system 22a, 22b when prompted, for example, through a website log-in or other user interface element.

At step 104, the user identifier 152 is used to obtain a user-specific seasonal affinity score 154 and one or more user-specific seasonal theme affinity scores 156a-156c. The user-specific seasonal affinity score 154 and/or the one or more user-specific seasonal theme affinity scores 156a-156c may be received from an affinity score calculation system 26. As discussed in greater detail below, the user-specific seasonal affinity score 154 and/or the one or more user-specific seasonal theme affinity scores 156a-156c may be calculated using one or more trained machine learning models configured to calculated seasonal affinity and/or theme affinity scores. The user-specific seasonal affinity score 154 and/or the one or more user-specific seasonal theme affinity scores 156a-156c may be pre-calculated for a user and/or may be calculated in "real-time" when a user interacts with a network interface system 24. In some embodiments, the user-specific seasonal affinity score 154 and/or the one or more user-specific seasonal theme affinity scores 156a-156c are represented by a number between 0 and 1, although it will be appreciated that any suitable range and/or representation may be used.

Each of the user-specific seasonal affinity score 154 and/or the one or more user-specific seasonal theme affinity scores 156a-156c identify a user affinity, or preference, for one or more selected seasons. A user-specific seasonal affinity score 154 above a selected threshold indicates that a user has an affinity, or preference, for a season. For example, a user-specific seasonal affinity score above a selected threshold for a "Valentine Season" illustrates a strong user preference for the Valentine's Day holiday. With respect to an e-commerce environment, a user-specific seasonal affinity score 154 above a selected threshold represents a likelihood that the user will purchase goods and services that are associated with the season. For example, continuing the "Valentine's Day" season example, a user having a user-specific season affinity score 154 above a selected threshold for "Valentine's Day" is more likely to purchase Valentine's Day themed decorations, presents, candies, etc., as compared to a baseline consumer. Conversely, a user-specific seasonal affinity score 154 below a selected threshold indicates a lack of interest or interaction with a specific season, and thus a lower likelihood of a user purchasing seasonal-themed products.

Similarly, a user-specific season theme affinity score 156a-156c above a selected threshold indicates a user preference for specific themes within a season. A season may include various themes such as, for example, "Seasonal decorations," "Seasonal foods," "Seasonal décor," "Seasonal candy," etc. A user may have a high affinity for one or more season-specific themes while having a low affinity for one or more other season-specific themes. As one non-limiting example, a user may have a "Halloween Candy" seasonal theme affinity score above a selected threshold and a "Halloween Decoration" seasonal theme affinity score below a selected threshold, indicating a preference for buying Halloween candy but not Halloween decorations.

At step 106, user-specific seasonal affinity score 154 and/or the one or more user-specific seasonal theme affinity scores 156a-156c are used to generate item and/or element recommendations for populating one or more user interface and/or network environment elements. For example, if a user has a user-specific seasonal affinity score 154 above a selected threshold for an active season, the element selection system 26 selects elements and/or items for presentation in the user interface from elements or products labeled as being associated with the active season. Similarly, if a user has one or more user-specific seasonal theme affinity scores 156a-156c above a selected threshold for an active season, the element selection system 26 selects elements and/or items for presentation identifies as being associated with the specific seasonal theme. Alternatively, in some embodiments, the element selection system 26 is configured to select generic elements and/or items for presentation when each of the relevant season affinity scores and/or theme affinity scores are below selected thresholds for active seasons.

The threshold used for identifying a user affinity with a specific season and/or specific theme may vary based on one or more factors. For example, in some embodiments, a threshold set for a season may be higher or lower depending on the regional popularity and/or observance of a specific season. Similarly, in some embodiments, a threshold for a seasonal theme may be higher and/or lower depending on the number of products associated with a theme. It will be appreciated that any suitable factors may be used to set seasonal and/or theme affinity thresholds.

Elements and/or items may be selected by the element selection system 26 using any suitable element selection process. For example, in some embodiments, the element selection system 26 implements an element selection process as described in U.S. Pat. Appl. No. 17,096,666, filed Nov. 12, 2020, entitled "Systems and Methods for Personalized Complementary Recommendations," the disclosure of which is incorporated herein by reference in its entirety.

At step 108, a network interface 160 is provided to the user system 22a, 22b including user-affinity elements 162 selected based on user-specific seasonal affinity score 154 and/or the one or more user-specific seasonal theme affinity scores 156a-156c. The network interface 160 may include user-affinity elements 162 (e.g., items, images, etc.) associated with one or more active seasons for which the user-specific seasonal affinity score 154 and/or the one or more user-specific seasonal theme affinity scores 156a-156c is above a selected threshold. Similarly, the network interface 160 may include generic elements 164 when the user-specific seasonal affinity score 154 and/or the one or more user-specific seasonal theme affinity scores 156a-156c are below a selected threshold for each of the active seasons.

Although embodiments are discussed herein including generation of a network interface, it will be appreciated that the seasonal affinity and/or seasonal theme affinity scores discussed below may be used for any suitable purpose. For example, in some embodiments, seasonal affinity and/or seasonal theme affinity scores may be calculated for a set of users to predict user demand for certain products or processes during a season. The prediction of user demand may be used, for example, to assist in logistical preparation for the season including stocking of various products, distribution of products, sales and marketing, and/or any other suitable logistical preparation based on user demand. It will be appreciated that additional uses of the calculated seasonal affinity and/or seasonal theme affinity scores may be possible and are within the scope of this disclosure.

Figure 5:
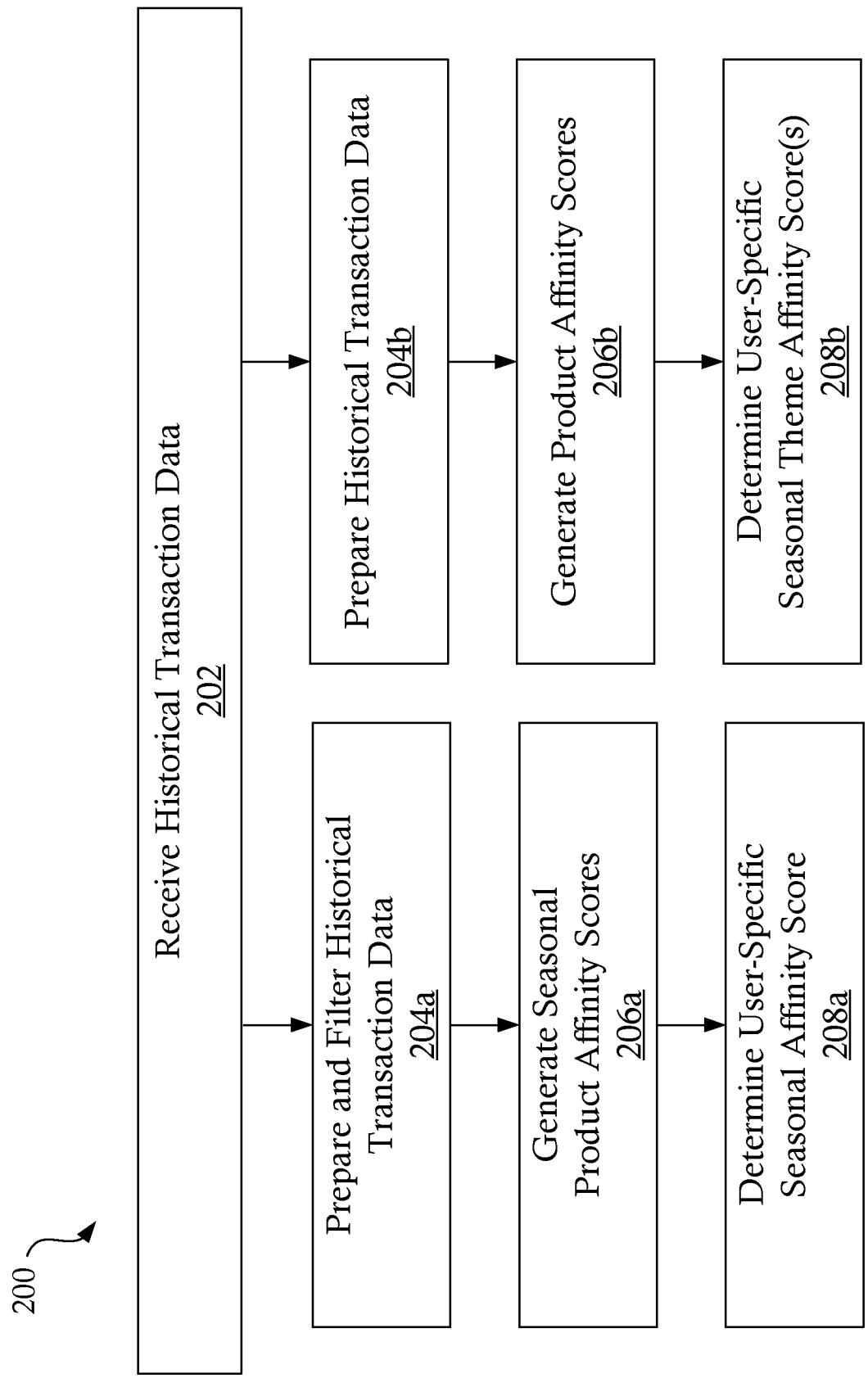
FIG. 5 is a flowchart illustrating a method of calculating at least one of a seasonal affinity score and/or at least one of a seasonal theme affinity score, in accordance with some embodiments.
Figure 6:
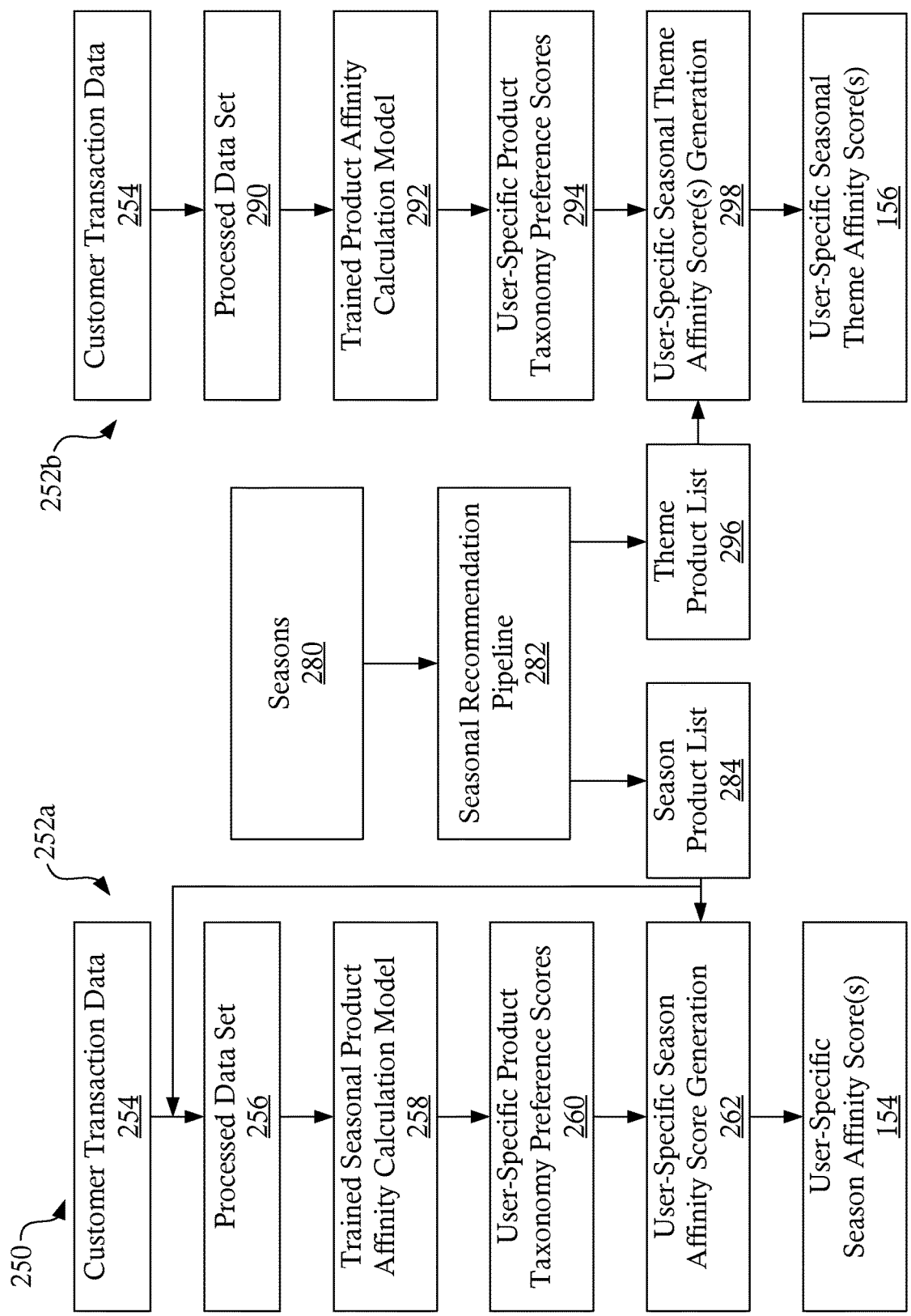
FIG. 6 is a process flow illustrating various steps of the method of calculating at least one a seasonal affinity score and/or at least one of a seasonal theme affinity score illustrated in FIG. 5, in accordance with some embodiments.

FIG. 5 is a flowchart illustrating a method 200 of calculating a seasonal affinity score and/or one or more seasonal theme affinity scores, in accordance with some embodiments. FIG. 6 illustrates a process flow 250 of the method 200 illustrated in FIG. 5, in accordance with some embodiments. As shown in FIG. 6, the method 200 includes two related, but separate, calculation tracks: a seasonal affinity score track 252a and a seasonal theme affinity score track 252b. The seasonal affinity score track 252a is configured to calculate seasonal affinity scores for one or more seasons, as discussed in greater detail below. Similarly, the theme affinity score track 252b is configured to calculate a theme affinity score for one or more themes associated with and/or defined for a season, as discussed in greater detail below. Each of the calculation tracks 252a, 252b includes the same initial step, step 202, during which historical transaction data 254 for a user is retrieved and/or received from one or more sources, such as, for example, a historical transaction database. The historical transaction data 254 may include transaction data for a specific user, such as a user associated with a user system 22a, 22b generating the request for a network interface. The historical transaction data 254 may include all historical transaction data for a user and/or may be limited to a specific time period. For example, in some embodiments, the historical transaction data 254 may include only the last X years of transactions for a user, although it will be appreciated that the historical transaction data 254 can include any set time period of transactions.

To calculate a seasonal affinity score, the historical data 254 is prepared and filtered at step 204a to generate a processed data set 256. During the preparation and filter step 204a, historical transaction data 254 may be limited (e.g., filtered) to retain only those transactions containing data relevant to a selected season. For example, in some embodiments, historical transaction data 254 may be filtered such that only transactions including items associated with a one or more specific seasons, such as, for example, a "Holiday" season are kept, while transactions including only items unrelated to the season(s) may be discarded. As one non-limiting example, historical transaction data 254 may be limited to only transactions containing items associated with the selected "Holiday" season such as "Holiday" lighting, toys, decorations, etc. Transactions that do not include at least one item associated with the selected season are discarded.

In some embodiments, historical transaction data 254 may be filtered based on a product attribute, such as a product type taxonomy, that is associated with one or more seasons. For example, the historical transaction data 254 may be filtered to retain only transactions including products having a taxonomy associated with a season, such as "Holiday decorations," "Holiday Décor," "Holiday Candy," "Holiday Food," "Holiday presents," etc. As a specific example, the historical transaction data 254 may be filtered to retain only transactions having "Christmas" taxonomies, such as, for example, "Christmas decorations," "Christmas décor," "Christmas candy," "Christmas food," etc. Other examples may include, but are not limited to, products with specific identifiers, brands, colors, features, keywords, etc. The historical transaction data 254 may be limited such that only a transaction involving at least one product in a set of product type taxonomies is included.

In some embodiments, filtering criteria, such as a seasonal product taxonomy list 284, may be used to filter the historical transaction data 254 to generate the processed data set 256. For example, in the illustrated embodiment, a seasonal product taxonomy list 284 is received from a seasonality recommendation pipeline 282 configured to generate seasonal product index scores for each season 280 defined by the system. Defined seasons 280 may be stored in any suitable form, such as, for example, a database file or other suitable data storage mechanism. Each season 280 includes information defining the season, such as, for example, time identifiers for the calendar period corresponding to a season, theme identifiers to identify one or more themes associated with a season, product taxonomy identifiers to identify one or more product types associated with a season, keywords, etc. Each season 280 may further include information used by the seasonality recommendation pipeline 282 to select specific items for presentation to a user in a network interface, as discussed above with respect to FIGS. 3-4. For example, in some embodiments, each season 280 includes promotions and/or modules configured to identify specific seasonal content that is presented in the network interface when a user has a high seasonal affinity score and/or seasonal theme affinity score.

In some embodiments, the seasonality recommendation pipeline 282 is configured to aggregate information from all users and/or all transactions with respect to the network interface to determine product type taxonomies, themes, etc. for each season. For example, the seasonality recommendation pipeline 282 may be configured to identify various themes and/or product taxonomies for a season defined for a set calendar period (e.g., Christmas Season defined between November 25 and December 25). In some embodiments, the seasonality recommendation pipeline 282 is configured to apply one or more processes and/or models, such as a clustering process, to identify products and themes associated with selected seasons.

In some embodiments, the historical transaction data 254 may be filtered to retain only transactions occurring during one or more specific time periods. The historical transaction data 254 may be limited to only transactions occurring during a predetermined "holiday season" that occurs during a set calendar period. For example, in some embodiments, the historical transaction data 254 may be limited to only those transactions occurring during the "Christmas season" occurring from the day after Thanksgiving (e.g., Black Friday) to some set time period after Christmas (e.g., New Year's Day). The predetermined time period may be defined on a fixed basis (e.g., a portion of a calendar year) and/or may be defined on a rolling basis (e.g., transaction data for the prior X year(s), month(s), week(s), etc.). In some embodiments, the predetermined time period is stored as part of the season 280 and provided by a seasonality pipeline 282. In some embodiments, the predetermine time period is one year.

In some embodiments, the historical transaction data 254 is converted into a form suitable for processing by a trained machine learning model, such as the trained seasonal product affinity calculation model 258 discussed below. The historical transaction data 254 may be processed to normalize or identify user data, product types, product counts, transaction counts, etc. In some embodiments, transactions having certain features under predetermine thresholds may be discarded, combined, or otherwise processed to minimize the impact of outlier transactions on the seasonal affinity score calculation. For example, in some embodiments, transactions related to specific product taxonomies may be included only where the historical transaction data 254 includes at least a threshold number of transactions including a product in a product taxonomy associated with the season, includes a number of products from specific product taxonomy, and/or any other suitable processing criteria. In some embodiments, the processed data set 256 may include a plurality of rows defining customer, product type taxonomy, and a corresponding number of transactions.

Continuing within the seasonal affinity score track 252a, at step 206a, the processed data set 256 is provided to a trained seasonal product affinity calculation model 258 configured to generate one or more seasonal product affinity scores 260. The trained seasonal product affinity calculation model 258 may be implemented using any suitable machine learning model, such as, for example, a collaborative filtering model. In some embodiments, the trained seasonal product affinity calculation model 258 is implemented by a trained alternating least square (ALS) model. The ALS model is a factorization model configured to alternate between solving for a first matrix, by fixing a second matrix and solving for the second matrix by fixing the first matrix. As discussed in greater detail below, the ALS model may be configured to minimize a cost function during training.

Although embodiments are discussed herein including an ALS model, it will be appreciated that any suitable model may be used to implement the trained seasonality calculation model 258. For example, and without limitation, the trained seasonality calculation model 258 may include a collaborative filtering model, a matrix factorization model, a gradient descent model, a singular value decomposition model, and/or any other suitable machine learning model.

The trained seasonal product affinity calculation model 258 is a trained machine learning model, such as an ALS model, trained using a training data set containing historical transaction data for seasonal products, for example, products including a seasonal product taxonomy, as previously discussed. The trained seasonal product affinity calculation model 258 is configured to generate an affinity score for product type taxonomies defined in the training data set. After training, the trained seasonal product affinity calculation model 258 is configured to receive historical transaction data 254, 256 corresponding to a user and determine user-specific seasonal product affinity scores 260 for one or more product type taxonomies, such as, for example, product type taxonomies associated with a season.

At step 208a, a user-specific season affinity score 154 is determined by a combination method 262 based on combination of seasonal product type affinity scores 260 for one or more product types associated with and/or belonging to the selected season. A seasonal product taxonomy list 284 may identify the specific product taxonomies associated with a selected season. In some embodiments, the individual seasonal product type affinity scores 260 are combined with weightings or other ranking metrics to generate a user-specific season affinity score 154. In some embodiments, the individual seasonal product type affinity scores 260 are combined with seasonality index scores representing weightings or rankings of specific product taxonomies for a specific season. The seasonality index scores may be stored as part of the season definitions 280 and/or provided by a seasonality recommendation pipeline 282. The seasonal product type affinity scores 260 may be combined according to any known combinatorial method. For example, in some embodiments, the seasonal product type affinity scores 260 are combined based on weighted averages, dot products, and/or any other suitable algorithmic combinations of the calculated seasonal product type affinity scores.

Figure 7:
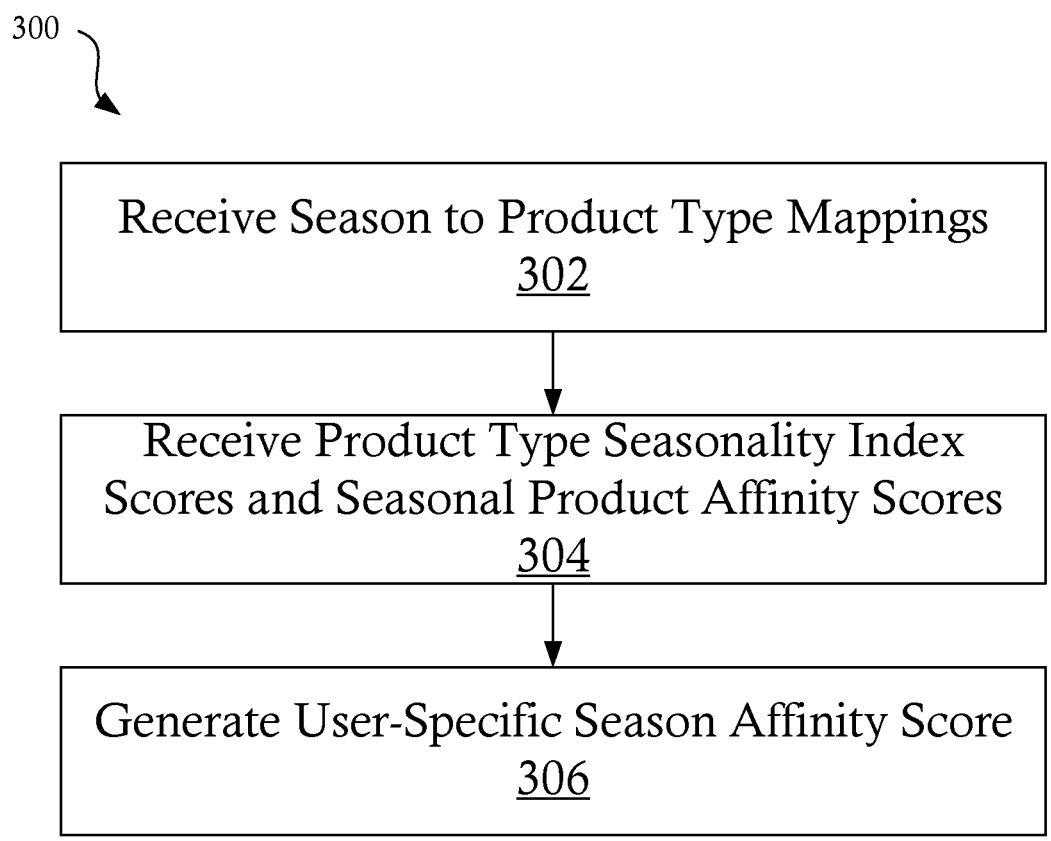
FIG. 7 is a flowchart illustrating a method of calculating a user-specific season affinity score based on a combination of seasonal product type affinity scores, in accordance with some embodiments.
Figure 8:
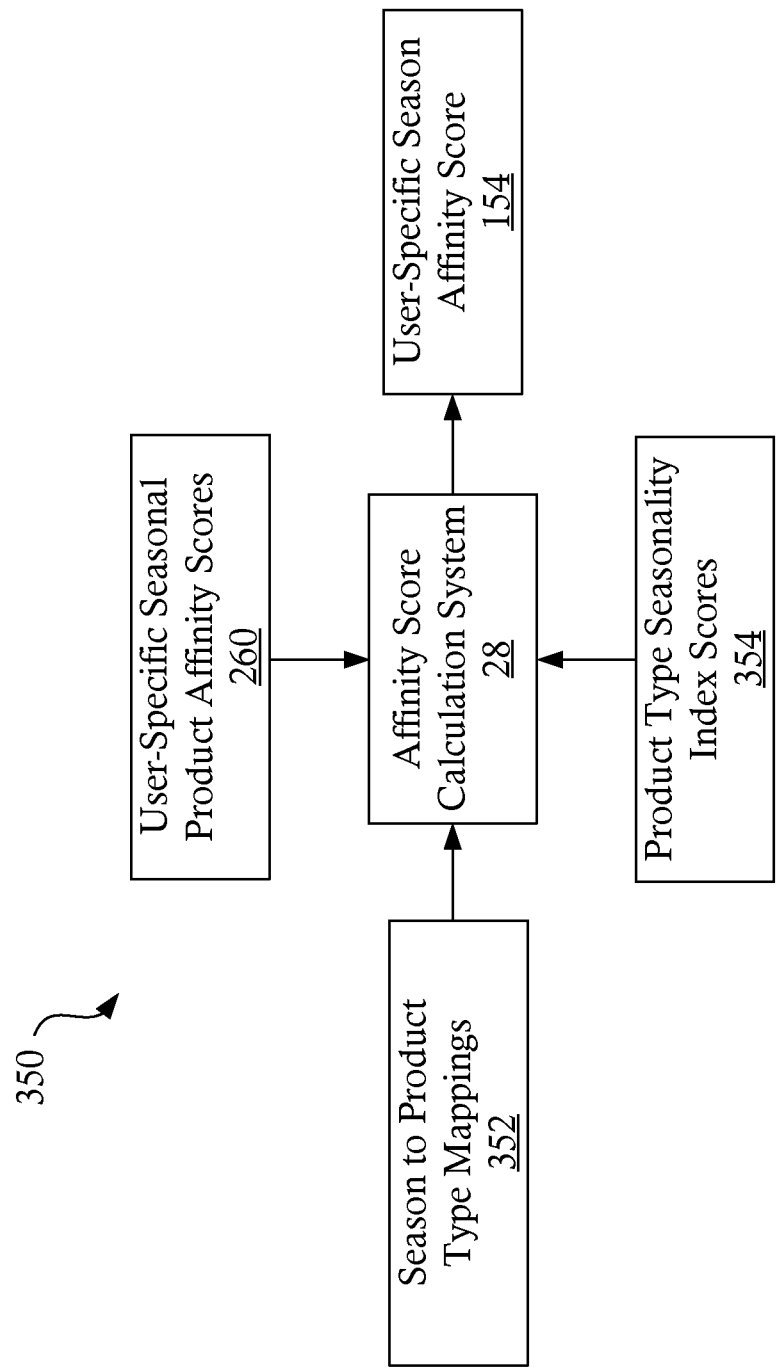
FIG. 8 is a process flow illustrating various steps of the method of calculating a user-specific season affinity score based on a combination of seasonal product type affinity scores illustrated in FIG. 7, in accordance with some embodiments.

FIG. 7 is a flowchart illustrating a method 300 of calculating a user-specific season affinity score 154 based on a combination of seasonal product type affinity scores 260, in accordance with some embodiments. FIG. 8 is a process flow 350 illustrating various steps of the method 300, in accordance with some embodiments. At step 302, a set of season to product type mappings 352 are received by a system, such as the affinity score calculation system 28. The set of season to product type mappings 352 identify the product taxonomies (or other product attributes) associated with one or more selected seasons. In some embodiments, the product type mappings 352 are received from the seasonality recommendation pipeline 282, although it will be appreciated that the product type mappings 352 may be stored in a separate database and/or received from a separate system.

At step 304, product type seasonality index scores 354 and user-specific product affinity scores 260 are received. The product type seasonality index scores 354 may be received from any suitable system or process, such as, for example, the seasonality recommendation pipeline 282. The user-specific seasonal product affinity scores 260 are received from the trained seasonal product affinity calculation model 258. It will be appreciated that the method 300 may be implemented as a part of the trained seasonal product affinity calculation model 258, in which case the user-specific seasonal product affinity scores 260 are passed from one internal, or hidden, layer of the trained seasonal product affinity calculation model 258 to a second internal, or hidden, layer configured to generate a user-specific season affinity score 154. In other embodiments, the method 300 may be executed separately from the trained seasonal product affinity calculation model 258 using output provided by the trained seasonal product affinity calculation model 258.

In some embodiments, the product type seasonality index scores 354 may be obtained by using one or more seasonality index and/or theme detection models. These models are configured to associate specific product types with specific themes. The models may be generated by an automated process, such as, for example, a machine learning process, and/or may be predefined models.

At step 306, the user-specific seasonal product affinity scores 260 and the seasonal product index scores 354 are combined according to a predetermined combination g(x,y) to generate a user-specific season affinity score 154. In some embodiments, calculating the user-specific seasonal affinity score 154 includes weighting each user-specific seasonal product affinity scores 260 based on a corresponding weighting provided by the seasonal product index scores 354. The weighting may be achieved using any suitable weighting mechanism and/or algorithm as is known in the art. Calculating the user-specific seasonal affinity score 154 may further include combining each of the weighted user-specific seasonal product affinity scores based on any suitable combinatorial method, such as, for example, a dot product method. In some embodiments, the trained seasonal product affinity calculation model 258 is configured to implement the combinatorial process g(x,y). In other embodiments, the combinatorial process g(x,y) may be implemented as a separate process.

With reference back to FIG. 5, the theme affinity score track 252b of the method 200 is discussed. The theme affinity score track 252b is similar to the season affinity score track 252a discussed above. To calculate a theme affinity score, the historical data 254 is processed at preparation step 204b to generate a processed data set 290. During the preparation step 204b, historical transaction data 254 may be converted into a form suitable for processing by a trained machine learning model, such as the trained product affinity calculation model 292 discussed below. The historical transaction data 254 may be processed to normalize or identify user data, product types, product counts, transaction counts, etc. It will be noted that, unlike the seasonal affinity score track 252a, processing of the historical transaction data 254 for use by the theme affinity score track 252b does not include filtering. Product type filtering is omitted for the theme affinity score track 252b to allow seasonal themes to be calculated for all potential product taxonomies identified in the set of historical transaction data 254.

At step 206b, the processed data set 290 is provided to a trained product affinity calculation model 292. The trained product affinity calculation model 292 is configured to generate one or more user-specific product affinity scores 294, in accordance with some embodiments. The trained product affinity calculation model 292 is similar to the trained seasonal product affinity calculation model 258 discussed above. However, the trained product affinity calculation model 292 is trained on a training data set including transactions not associated with specific seasons in order to identify product affinities separate from and/or across multiple seasons. For example, a theme may include "decorations" and purchases of decorations across different seasons may each contribute to an affinity for "decoration" products within each season.

At step 208b, user-specific seasonal theme affinity scores 156 are generated by a combination method 298 based on product taxonomy affinity scores 294 for one or more product types associated with and/or belonging to a seasonal theme included in one or more selected seasons. A seasonal theme product taxonomy list 296 may identify specific product taxonomies associated with specific seasonal themes. In some embodiments, the individual product type affinity scores 294 are combined with weightings or other ranking metrics to generate the user-specific seasonal theme affinity scores 156. In some embodiments, the individual product type affinity scores 294 are combined with product type seasonality index scores representing weightings or rankings of specific product taxonomies for a specific season or seasonal theme. The seasonality index scores may be stored as part of the season definitions 280 and/or provided by a seasonality recommendation pipeline 282. The product type affinity scores 294 may be combined according to any known combinatorial method. For example, in some embodiments, the product type affinity scores 294 are combined based on weighted averages, dot products, and/or any other suitable algorithmic combinations of the calculated seasonal product type affinity scores.

Figure 9:
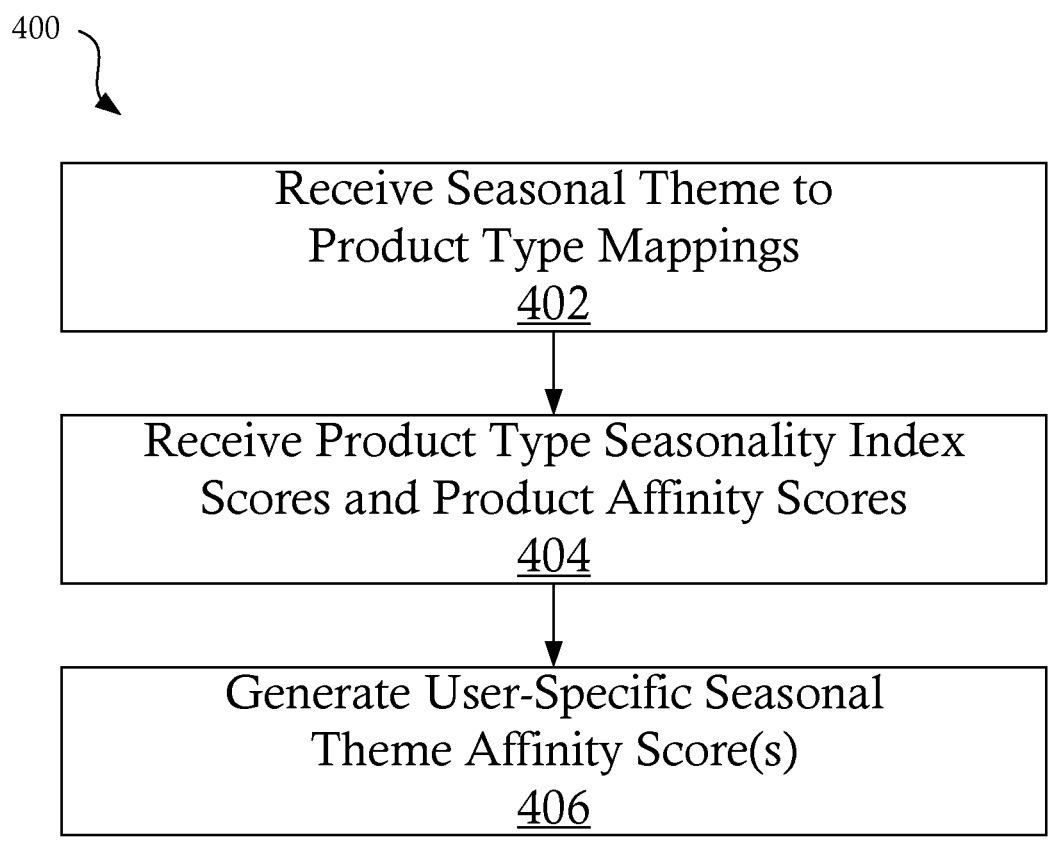
FIG. 9 is a flowchart illustrating a method of calculating user-specific seasonal theme affinity scores based on a combination of product type affinity scores, in accordance with some embodiments.
Figure 10:
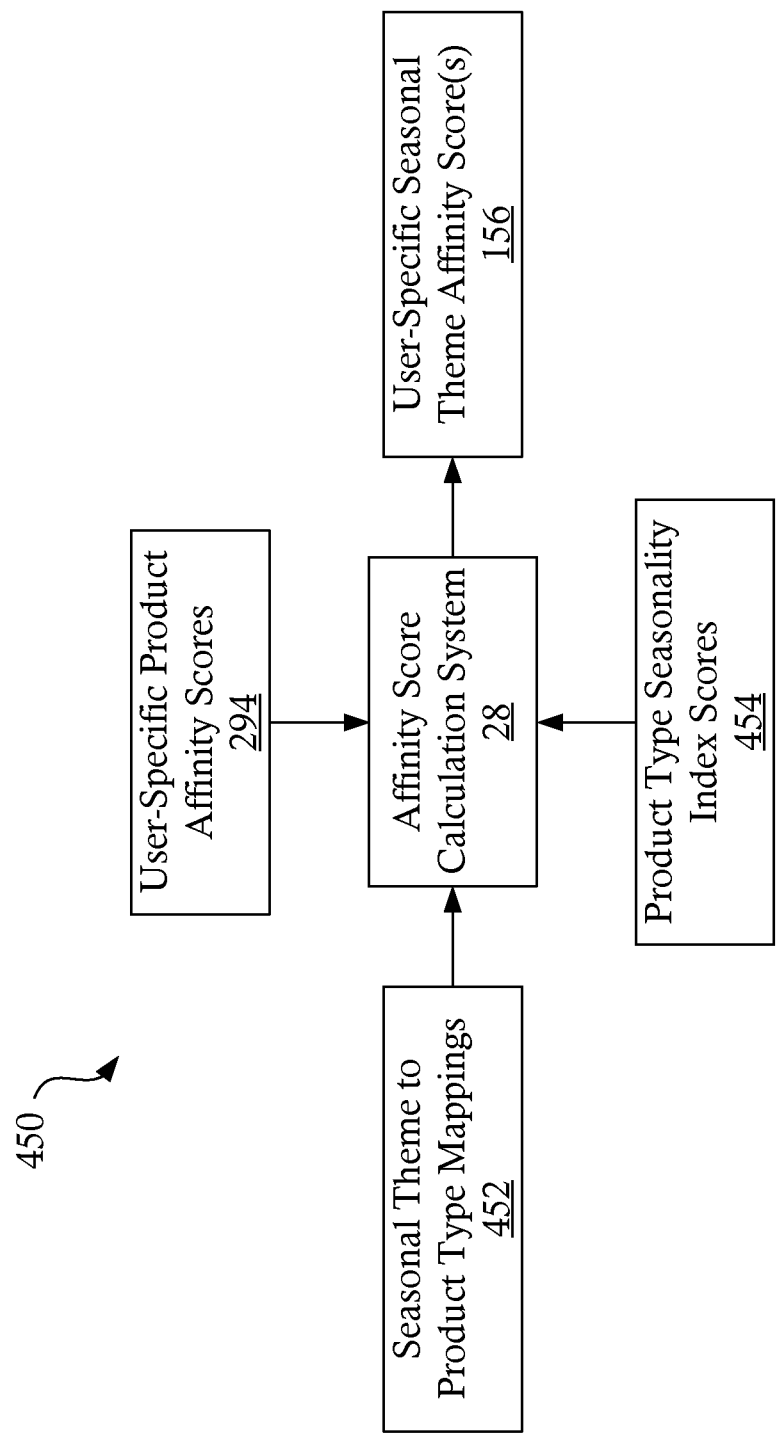
FIG. 10 is a process flow illustrating various steps of the method of calculating user-specific seasonal theme affinity scores based on a combination of product type affinity scores illustrated in FIG. 9, in accordance with some embodiments.

FIG. 9 is a flowchart illustrating a method 400 of calculating user-specific seasonal theme affinity scores 156 based on a combination of product type affinity scores 294, in accordance with some embodiments. FIG. 10 is a process flow 450 illustrating various steps of the method 400, in accordance with some embodiments. At step 402, a set of seasonal theme to product type mappings 452 are received by a system, such as the affinity score calculation system 28. The set of seasonal theme to product type mappings 452 identify the product taxonomies (or other product attributes) associated with one or more seasonal themes of a selected season. In some embodiments, the seasonal theme to product type mappings 452 are received from the seasonality recommendation pipeline 282, although it will be appreciated that the seasonal theme to product type mappings 452 may be stored in a separate database and/or received from a separate system.

At step 404, product type seasonality index scores 454 and user-specific product affinity scores 294 are received. The product type seasonality index scores 454 may be received from any suitable system or process, such as, for example, the seasonality recommendation pipeline 282. The user-specific product affinity scores 294 are received from the trained product affinity calculation model 292. It will be appreciated that the method 400 may be implemented as a part of the trained product affinity calculation model 292, in which case the user-specific product affinity scores 294 are passed from one internal, or hidden, layer of the trained product affinity calculation model 292 to a second internal, or hidden, layer configured to generate user-specific seasonal theme affinity scores 156. In other embodiments, the method 400 may be executed separately from the trained product affinity calculation model 292 using output provided by the trained product affinity calculation model 292.

At step 406, the user-specific product affinity scores 294 and the seasonal product index scores 454 are combined according to a predetermined combination f(x,y) to generate user-specific seasonal theme affinity scores 156. In some embodiments, calculating the user-specific seasonal theme affinity scores 156 includes weighting each user-specific product affinity scores 294 based on a corresponding weighting provided by the product seasonality index scores 454. The weighting may be achieved using any suitable weighting mechanism and/or algorithm as is known in the art. Calculating the user-specific seasonal theme affinity scores 156 may further include combining each of the weighted user-specific product affinity scores based on any suitable combinatorial method, such as, for example, a dot product method. In some embodiments, the trained product affinity calculation model 292 is configured to implement the combinatorial process f(x,y). In other embodiments, the combinatorial process f(x,y) may be implemented as a separate process.

In some embodiments, user-specific seasonal theme affinity scores 156 are generated such that the total of all of the user-specific seasonal theme affinity scores 156 for a specific season equals a predetermined total. For example, the user-specific seasonal theme affinity scores 156 for each season may be calculated as a value between 0 and 1 such that the total of the user-specific seasonal theme affinity scores is equal to 1. Similarly, the user-specific seasonal theme affinity scores 156 for each season may be calculated as a percentage value such that the total of the user-specific seasonal theme affinity scores is equal to 100%.

In some embodiments, the user-specific seasonal theme affinity scores 156a-156c may be time-dependent. For example, a user's preference for certain seasonal themes may increase or decrease based on timing within a season. As one non-limiting example, in some embodiments, a user may have a high seasonal affinity for a "Christmas Season." The "Christmas Season" may include various seasonal themes, such as "Christmas Décor," "Christmas Candies," "Christmas Food," etc. For a first time period within the Christmas Season, such as a period earlier in the calendar year with respect to the "Christmas Season," a user may have a higher affinity for certain seasonal themes, such as the "Christmas Décor" theme, while having a lower affinity for certain other seasonal themes, such as the "Christmas Food" theme. As the seasons progresses, the user affinity for certain seasonal themes, such as the "Christmas Décor" theme, may decrease (representing a lower likelihood of buying themed décor as the holiday approaches) and user affinity for certain other seasonal themes, such as the "Christmas Food" theme, may increase (representing a higher likelihood of buying holiday-specific food as the holiday approaches). Changes in theme affinity over a season may be represented by using different product type seasonality index scores 454 depending on temporal input, such as, for example, based on an identification of a specific portion of a season. Time-dependent seasonal theme affinity scores may be calculated simultaneously and/or may be calculated in real-time when a user requests a user interface through the network interface system 24.

Figure 11:
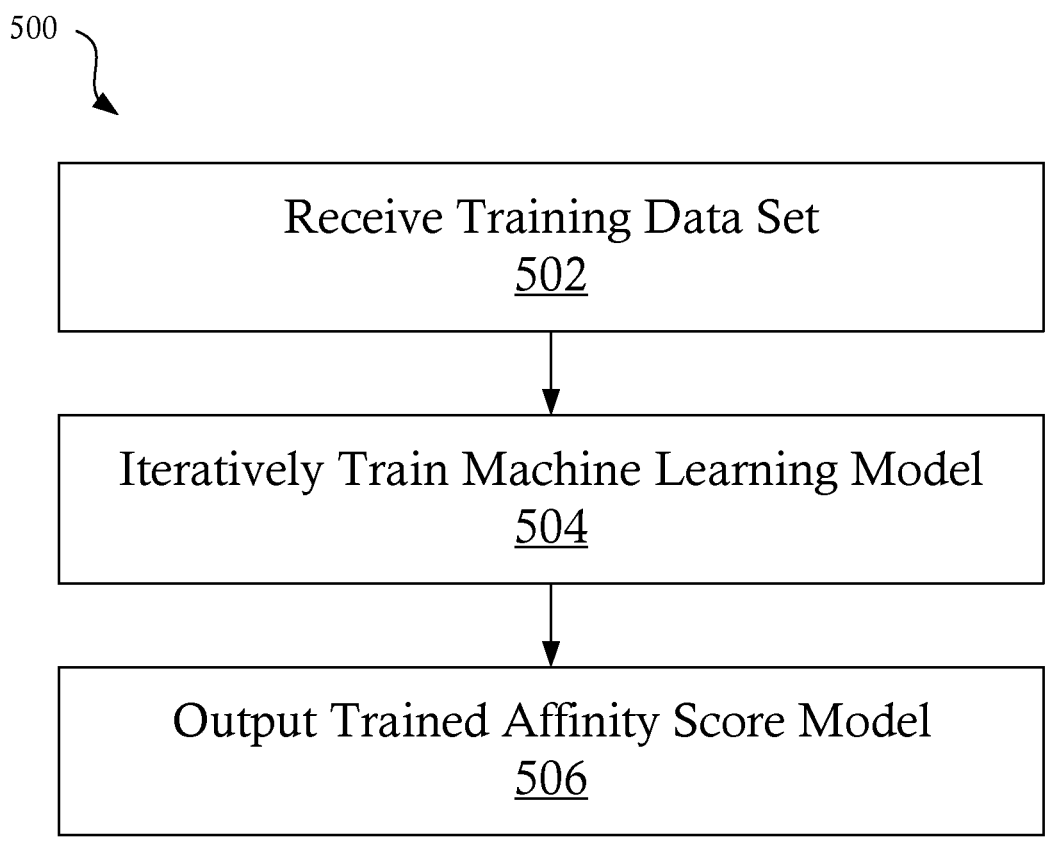
FIG. 11 is a flowchart illustrating a method of training a seasonality score calculation model and/or a seasonal theme score calculation model, in accordance with some embodiments.
Figure 12:
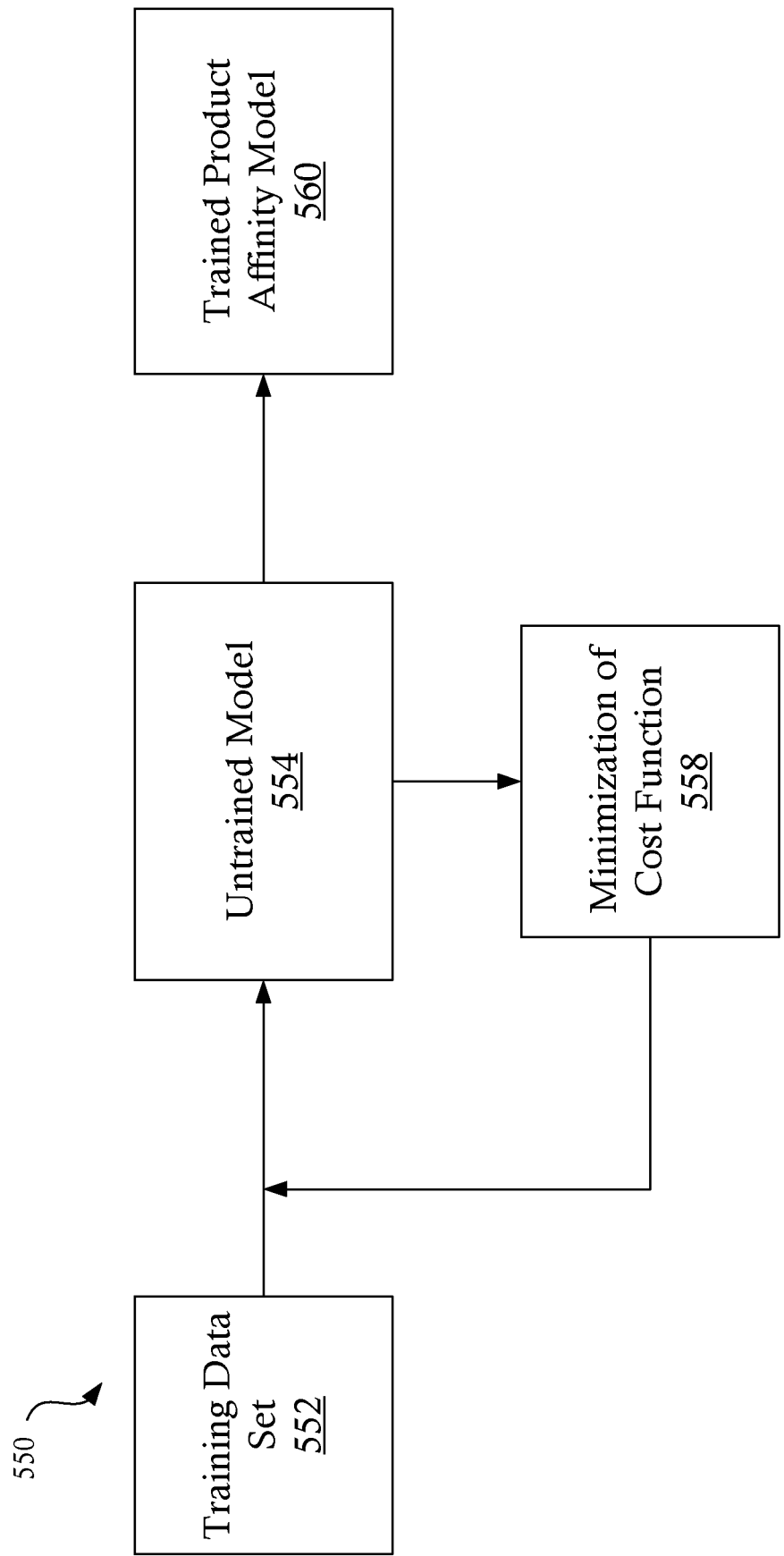
FIG. 12 is a process flow illustrating various steps of the method of training a seasonality score calculation model and/or a seasonal product affinity calculation model illustrated in FIG. 11, in accordance with some embodiments.

FIG. 11 is a flowchart illustrating a method 500 of training a seasonality score calculation model 258 and/or a seasonal product affinity calculation model 292, in accordance with some embodiments. FIG. 12 is a process flow 550 illustrating various steps of the method 500, in accordance with some embodiments. At step 502, a training data set 552 is received at a system configured to train a model, such as, for example, a model training system 30. The training data set 552 includes a set of labeled data configured to train an untrained model 554 according to one or more predetermined training processes. For example, in some embodiments, the set of training data 254 includes historical transaction data for a set of users over a predetermined time period, a set of seasons and seasonal parameters (e.g., time periods, seasonal themes, product type seasonal index scores, weightings, etc). The predetermined time period may be any suitable time period, such as, for example, one month, three months, six months, one year, etc.

At step 504, a machine learning process is iteratively applied to convert the untrained model 554 into a trained product affinity model 560. For example, in some embodiments, an ALS model is trained based on implicit feedback data to find product type affinities and/or preferences by minimizing a cost function 558 defined as:

$$\min_{x_*, y_*} \sum_{u,i} c_{ui}(p_{ui} - x_u^T y_i)^2 + \lambda \left( \sum_u \|x_u\|^2 + \sum_i \|y_i\|^2 \right)$$

where $p_{ui}$ is a preference for a user u to item I such that $p_{ui}$ is 1 if the number of transactions is greater than 0 and otherwise is 0, $c_{ui}$ is a set of variable representing and/or measuring confidence in observing $p_{ui}$, $x_u$ is the $u^{th}$ column in a user matrix, and $y_i$ is the $i^{th}$ column in a product type matrix. Although specific embodiments are discussed herein, it will be appreciated that any suitable training method and/or cost function may be used.

At step 506, a trained model 556 is output. The trained product affinity model 560 is configured to generate either user-specific seasonal product affinity scores 260 or user-specific product affinity scores 294. The trained product affinity model 560 may include a trained seasonality scoring calculation model 258 and/or a trained seasonal product affinity calculation model 292, depending on the training data set 552 provided thereto. For example, if a training data set 552 is filtered to include season-specific product taxonomies, the training process will generate a trained seasonality scoring calculation model 258. As another example, if a training data set 552 includes general transactions without season-specific filtering, a seasonal them score calculation model 292 will be output.

Although the subject matter has been described in terms of exemplary embodiments, the claims should be construed broadly, to include other variants and embodiments, which may be made by those skilled in the art.

What is claimed is:

1. A system, comprising:
a non-transitory memory having instructions stored thereon; and
a processor configured to read the instructions to:
generate a user identifier based on receiving an indication of a specific user interacting with a user interface;
map the user identifier to the specific user;
obtain a set of user-specific historical transaction data associated with the user identifier, the user-specific historical transaction data being generated based on one or more interactions of the specific user with the user interface;
receive a training data set including a set of historical transaction data associated with a plurality of users over a predetermined time period;
iteratively train a first machine learning model based on implicit feedback data and the training data set to find season affinity scores by minimizing a first cost function;
iteratively train a second machine learning model based on implicit feedback data and the training data set to find product affinity scores by minimizing a second cost function, wherein:

each of the first machine learning model and the second machine learning model is a factorization model configured to alternate between solving for a first matrix by fixing a second matrix and solving for the second matrix by fixing the first matrix, the second cost function comprises a preference for a user u to item I ($p_{ui}$) such that $p_{ui}$ is 1 if a number of transactions is greater than 0 and otherwise is 0, a set of variables measuring confidence in observing $p_{ui}$, a $u^{th}$ column in a user matrix, and an $i^{th}$ column in a product type matrix;

determine a user-specific affinity score, wherein the user-specific affinity score is associated with the specific user and determined by:

obtaining a set of season to product mappings identifying product taxonomies associated with one or more selected seasons, inputting the user-specific historical transaction data into the trained first machine learning model to generate user-specific seasonal product affinity scores, combining the user-specific seasonal product affinity scores with seasonal product index scores to generate a user-specific season affinity score, obtaining a set of seasonal theme to product type mappings identifying product taxonomies associated with one or more seasonal themes of the one or more selected seasons, inputting the user-specific historical transaction data into the trained second machine learning model to generate user-specific product affinity scores, combining the user-specific product affinity scores with seasonal product index scores to generate a plurality of user-specific seasonal theme affinity scores, computing the user-specific affinity score associated with the specific user based on the user-specific season affinity score and the plurality of user-specific seasonal theme affinity scores;

compare the user-specific affinity score to a predetermined dynamic threshold, the predetermined dynamic threshold being based on one or more external factors associated with the specific user; and generate, on the user interface, one or more user-specific interface elements if the user-specific affinity score is above the predetermined dynamic threshold and one or more generic interface elements if the user-specific affinity score is below the predetermined dynamic threshold.

2. The system of claim 1, wherein the set of user-specific historical transaction data is filtered based on a set of seasonal products taxonomies prior to being provided to the trained first machine learning model and the trained second machine learning model.

3. The system of claim 1, wherein combining the user-specific seasonal product affinity scores with seasonal product index scores comprises a weighted combination.

4. The system of claim 1, wherein combining the user-specific seasonal product affinity scores with seasonal product index scores comprises a dot combination.

5. The system of claim 1, wherein each of the first machine learning model and the second machine learning model is a trained alternating least square (ALS) model.

6. The system of claim 1, wherein generating one or more interface elements comprises:

selecting interface elements associated with a season when the user-specific affinity score is above a predetermined threshold; and selecting generic interface elements when the user-specific affinity score is below a predetermined threshold.

7. A non-transitory computer readable medium having instructions stored thereon, wherein the instructions, when executed by a processor cause a device to perform operations comprising:

generating a user identifier based on receiving an indication of a specific user interacting with a user interface;

mapping the user identifier to the specific user;

obtaining a set of user-specific historical transaction data associated with the user identifier, the user-specific historical transaction data being generated based on one or more interactions of the specific user with the user interface;

receiving a training data set including a set of historical transaction data associated with a plurality of users over a predetermined time period;

iteratively training a first machine learning model based on implicit feedback data and the training data set to find season affinity scores by minimizing a first cost function;

iteratively training a second machine learning model based on implicit feedback data and the training data set to find product affinity scores by minimizing a second cost function, wherein:

each of the first machine learning model and the second machine learning model is a factorization model configured to alternate between solving for a first matrix by fixing a second matrix and solving for the second matrix by fixing the first matrix, the second cost function comprises a preference for a user u to item I ($p_{ui}$) such that $p_{ui}$ is 1 if a number of transactions is greater than 0 and otherwise is 0, a set of variables measuring confidence in observing $p_{ui}$, a $u^{th}$ column in a user matrix, and an $i^{th}$ column in a product type matrix;

determining, a user-specific affinity score, wherein the user-specific affinity score is associated with the specific user and determined by:

obtaining a set of season to product mappings identifying product taxonomies associated with one or more selected seasons, inputting the user-specific historical transaction data into the trained first machine learning model to generate user-specific seasonal product affinity scores, combining the user-specific seasonal product affinity scores with seasonal product index scores to generate a user-specific season affinity score, obtaining a set of seasonal theme to product type mappings identifying product taxonomies associated with one or more seasonal themes of the one or more selected seasons, inputting the user-specific historical transaction data into the trained second machine learning model to generate user-specific product affinity scores, combining the user-specific product affinity scores with seasonal product index scores to generate a plurality of user-specific seasonal theme affinity scores, computing the user-specific affinity score associated with the specific user based on the user-specific season affinity score and the plurality of user-specific seasonal theme affinity scores;

comparing the affinity score to a predetermined dynamic threshold, the predetermined dynamic threshold being based on one or more external factors associated with the specific user; and generating, on the interface, one or more user-specific interface elements if the user-specific affinity score is above the predetermined dynamic threshold and one or more generic interface elements if the user-specific affinity score is below the predetermined dynamic threshold.

8. The non-transitory computer readable medium of claim 7, wherein the set of historical transaction data is filtered based on a set of seasonal products taxonomies prior to being provided to the trained first machine learning model and the trained second machine learning model.

9. The non-transitory computer readable medium of claim 7, wherein combining the user-specific seasonal product affinity scores with seasonal product index scores comprises a weighted combination.

10. The non-transitory computer readable medium of claim 7, wherein combining the user-specific seasonal product affinity scores with seasonal product index scores comprises a dot combination.

11. The non-transitory computer readable medium of claim 7, wherein each of the first machine learning model and the second machine learning model is a trained alternating least square (ALS) model.

12. The non-transitory computer readable medium of claim 7, wherein generating one or more interface elements comprises:
selecting interface elements associated with a season when the affinity score is above a predetermined threshold; and
selecting generic interface elements when the affinity score is below a predetermined threshold.

13. A method, comprising:
generating a user identifier based on receiving an indication of a specific user interacting with a user interface;
mapping the user identifier to the specific user;
obtaining a set of user-specific historical transaction data associated with the user identifier, the user-specific historical transaction data being generated based on one or more interactions of the specific user with the user interface;
receiving a training data set including a set of historical transaction data associated with a plurality of users over a predetermined time period;
iteratively training a first machine learning model based on implicit feedback data and the training data set to find season affinity scores by minimizing a first cost function;
iteratively training a second machine learning model based on implicit feedback data and the training data set to find product affinity scores by minimizing a second cost function, wherein:
each of the first machine learning model and the second machine learning model is a factorization model configured to alternate between solving for a first matrix by fixing a second matrix and solving for the second matrix by fixing the first matrix,
the second cost function comprises a preference for a user u to item I ($p_{ui}$) such that $p_{ui}$ is 1 if a number of transactions is greater than 0 and otherwise is 0, a set of variables measuring confidence in observing $p_{ui}$, a $u^{th}$ column in a user matrix, and an $i^{th}$ column in a product type matrix;
determining, a user-specific affinity score, wherein the user-specific affinity score is associated with the specific user and determined by:
obtaining a set of season to product mappings identifying product taxonomies associated with one or more selected seasons,
inputting the user-specific historical transaction data into the trained first machine learning model to generate user-specific seasonal product affinity scores,
combining the user-specific seasonal product affinity scores with seasonal product index scores to generate a user-specific season affinity score,
obtaining a set of seasonal theme to product type mappings identifying product taxonomies associated with one or more seasonal themes of the one or more selected seasons,
inputting the user-specific historical transaction data into the trained second machine learning model to generate user-specific product affinity scores,
combining the user-specific product affinity scores with seasonal product index scores to generate a plurality of user-specific seasonal theme affinity scores,
computing the user-specific affinity score associated with the specific user based on the user-specific season affinity score and the plurality of user-specific seasonal theme affinity scores;
comparing the affinity score to a predetermined dynamic threshold, the predetermined dynamic threshold being based on one or more external factors associated with the specific user; and
generating, on the interface, one or more user-specific interface elements if the user-specific affinity score is above the predetermined dynamic threshold and one or more generic interface elements if the user-specific affinity score is below the predetermined dynamic threshold.

14. The method of claim 13, wherein the set of historical transaction data is filtered based on a set of products taxonomies prior to being provided to the trained first machine learning model and the trained second machine learning model.

15. The method of claim 13, wherein combining the user-specific seasonal product affinity scores with seasonal product index scores comprises weighting each of the user-specific seasonal product affinity scores by a corresponding product index score and combining each weighted user-specific seasonal product affinity score using a dot product.

* * * * *